March 19, 1968     D. H. TROTT     3,373,611
STEAK THERMOMETER
Filed March 4, 1966
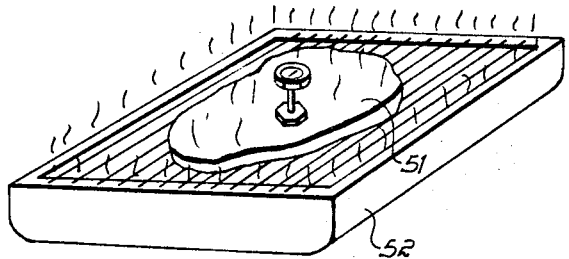
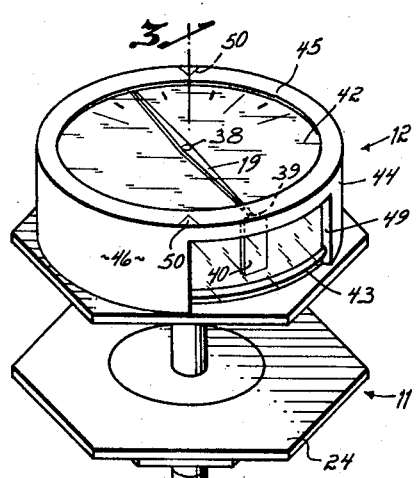
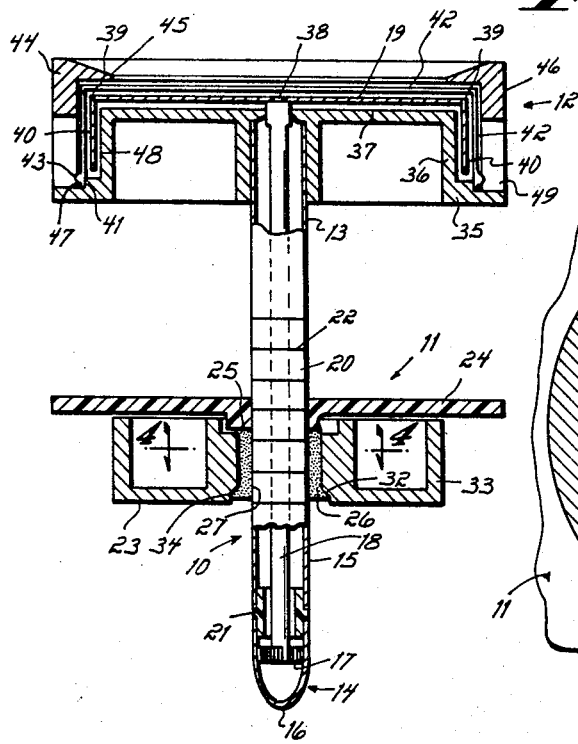
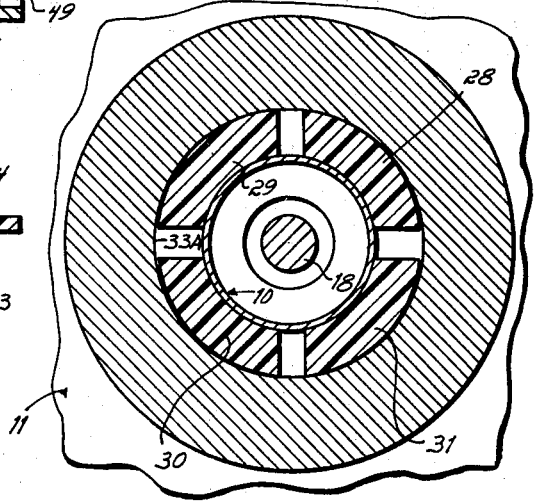
INVENTOR
David H. Trott
BY
Wood, Herron & Evans
ATTORNEYS United States Patent Office 3,373,611
Patented Mar. 19, 1968

3,373,611
STEAK THERMOMETER
David H. Trott, % Crossbow, Inc., 8120 Blue Ash Road, Cincinnati, Ohio 75236
Filed Mar. 4, 1966, Ser. No. 531,729
7 Claims. (Cl. 73—352)

ABSTRACT OF THE DISCLOSURE

A steak thermometer having an elongated probe and a temperature-indicating mechanism at one end of the probe, the thermometer including an adjustable stop for setting the depth of penetration of the probe, the thermometer further including a windowed viewing device for determining the attainment of a pre-selected temperature by the appearance or disappearance of a heat responsive pointer.

This invention relates to a steak thermometer. More particularly, this invention relates to a steak thermometer which is very convenient to use and especially adapted for use in grilling steaks on a charcoal grill.

The grilling of a steak is an art requiring skill, judgment and experience. The grilling of a steak is an art because of the several variables which are involved, namely, the thickness of the steak, the heat of the coals, the distance of the steak from the coals, and the time of cooking. Even the wind can be a considerable factor in the time required for grilling. Because of these variables many steaks are imperfectly grilled if not ruined altogether.

It has been an objective of the present invention to bring to the art of cooking steaks at least some measure of science and thereby to minimize the possibility of an unsatisfactory result. This objective is achieved in part by providing a thermometer which is especially adapted for application to steaks.

Even though the grilling of steaks is a leisurely type of operation, inevitably the cook finds himself tending the fire and steak instead of relaxing and enjoying the company of his family or guests. Because of the heat and the smoke, the grill is usually set apart from the conversation area and the cook is therefore not close enough to the steak to attend it without getting up from his seat.

It is therefore another objective of the invention to provide a steak thermometer which is specially adapted to be observed by a person sitting a considerable distance from the grill.

Prior art

There are meat thermometers in the prior art. These can be characterized generally as being of two types. The first is the thermometer which is well known to the housewife for use in the cooking of roasts and the like and has a long pointed probe adapted to be inserted into the center of the roast. At the free end of the probe is a temperature indicating dial.

This thermometer is obviously not suitable for the cooking of steaks for it requires substantial penetration into the meat in order to be supported. Also, this thermometer requires substantial penetration because of the length of the temperature sensing element it employs, that is, to achieve complete insertion of the sensing element the probe must be inserted a relatively substantial depth into the meat. Of course, it would also be extremely difficult, if not next to impossible, to determine accurately the depth of penetration and, in this way, reproduce satisfactory results.

The second thermometer known in the art is stated to be useful in the cooking of thin cuts of meat. That thermometer has a body portion which is of a rather complex nature and a probe attached to the body portion, the probe being adapted to be inserted into the meat. The body portion has a skirt threaded to it so that the edge of the skirt can be positioned at varying distances from the tip of the probe, thereby setting the depth of penetration of the probe into the meat.

The second thermometer is too complex to be manufactured economically for purchase by the casual outdoor chef, and it is not designed to meet the requirements of casual, social, leisurely cooking.

The invention

The thermometer according to the present invention has an elongated probe with a temperature detector in one end and an indicator head mounted on the other end. A simple two element adjustable stop is slidably mounted on the probe and adapted to cooperate with calibration lines on the probe in order to fix the depth of penetration of the probe into the meat.

The indicator head includes a drum shaped element having a thermometer face on its flat surface. The pointer extends from the center of the thermometer face and terminates at the edge of this drum in a depending indicator flag. The indicator flag thus overlies the normally vertical cylindrical surface of the drum in a position easily seen by a seated observer. The drum and pointer are covered by a transparent housing and a selector cap is rotatably mounted on the housing, the selector cap having a window through which the flag can be seen. The selector cap may be set at a desired temperature, and the attainment of that temperature is indicated by the flag's disappearing from view through the window.

Therefore, it has been an objective of this invention to provide a steak thermometer which greatly contributes to the comfort and convenience of the user.

It has been another objective of this invention to provide a steak thermometer which will enable a novice outdoor chef to cook a steak rare, medium, or well done without substantial experience in the grilling of steaks.

It has been a further objective of this invention to provide a steak thermometer having a cooperating temperature selector and pointer, the thermometer permitting the movement of the pointer toward the selected temperature to be clearly observed at a glance from a substantial distance.

It has been yet a further objective of this invention to provide a steel thermometer having a cooperating temperature selector and flag, the thermometer permitting the flag to disappear behind the temperature selector, thereby allowing the presence or absence of a preselected temperature to be determined at a glance from a distance.

It has been another objective of this invention to provide an easily operated adjustable stop of simple construction for a steak thermometer so that, as the thermometer probe is inserted into the steak, the desired depth to which the temperature sensing element will be placed within the steak may be rapidly effected.

It has been yet another objective of this invention to provide a positive locking stop for a steak thermometer so that, as the thermometer is rotated and pressed down on the steak when inserting the probe, the locking stop will not slip and create uncertainty as to the depth of insertion.

The above mentioned, as well as other objects and advantages of the present invention, will be more readily apparent from the following detailed description of the drawings which illustrate a preferred embodiment of the invention.

In the drawings:

FIGURE 1 is a perspective view of the preferred embodiment of the invention in use on a steak which is shown as cooking on an outdoor charcoal grill.

FIGURE 2 is an enlarged perspective view of the preferred embodiment constructed in accordance with the principles of this invention.

FIGURE 3 is a cross-sectional view taken along line 3— of FIGURE 2.

FIGURE 4 is a cross-sectional view taken along line 4—4 of FIGURE 3.

As can be readily observed from FIGURE 2, the steak thermometer generally includes an elongated probe 10 having an adjustable stop 11 which is slidable along the probe, and an indicator head 12 which is secured to a top or upper end 13 of the probe.

As best seen from FIGURE 3, a temperature detector 14 is mounted in the lower end of the probe 10. The detector 14 includes the tip of probe casing 15, indicated at 16, and a bimetal 17 coiled within the tip 16. One end of the bimetal coil 17 is secured to the inside of the tip 16 and the other end is secured to a shaft 18. The properties of the bimetal 17 are well known as expansion or contraction of the coil depends on the differential expansion of the thin dissimilar metals that are laminated together in a narrow strip to form the bimetallic coil. The expansion or contraction of the coil 17 is translated into rotation of the shaft 18, which in turn rotates a twin-tipped pointer 19 located within the indicator head 12.

The temperature detector 14 is separated from a shank portion 20 of the probe casing 15 by means of an insulator bushing 21 which confines the heat imparted to the detector to the bimetallic temperature sensing coil 17 and prevents that heat from being dissipated by conduction in the shank portion 20 of the casing 15.

The shank portion 20 of the probe casing 15 is provided with graduations or markings 22 which are marked so that the adjustable stop 11 may be easily and quickly located at a known distance from the temperature detector 14, thereby providing means for insertion of the temperature detector to a known depth within the steak. The tip 16 of the probe 10 may be made of any conductive metal which does not adversely affect food such as, for example, a stainless steel.

The stop 11 has positive locking features so that as the thermometer is rotated, in an attempt to locate the tip 16 of the probe 11 in the steak, the stop 11 will not become loose on the casing 15 but will remain tightly held to it. A base 23 of the adjustable stop 11 cooperates with the surface of the steak to prevent the temperature detector 14, as it is being initially positioned, from being inserted further than is desired. The stop 11 includes a flange or collar 24 having an integral split sleeve 26 depending therefrom, as at 25. The central bore 27 through the collar 24 and the split sleeve 26 is of such diameter, relative to the diameter of the shank 20 of the probe casing 15, that frictional contact is provided therebetween. The split sleeve 26 is divided into quadrant portions or sections 28–31. The sections 28–31 of the sleeve 26 are separated by slots of a width substantial enough to allow the sections to be squeezed inwardly. As best seen from FIGURE 4, the outer periphery of the split sleeve is elliptical in shape, i.e., the major diameter is larger than the minor diameter. Each quadrant 28–31 of the split sleeve 26, at the open end of the sleeve, has a lip 32 which cooperates with an annular groove 34 on a tightening nut 33 to maintain the nut in operational position with the split sleeve. The lip 32 is axially spaced from the collar 24 at a distance approximately equal to the thickness of the nut 33. As can again best be seen from FIGURE 4, the central bore 33A of the nut 33 is also elliptical in shape. Thus, when the major diameters of the split sleeve 26 and the nut 33 are mated, the adjustable stop 11 becomes loose and may be slid relative to the temperature detector 15. To maintain the adjustable stop 11 in a permanent or positively fixed position relative to the temperature detector 14, the minor diameter of the nut 33 is mated with the major diameter of the split sleeve 26. Thus, the quadrants 28–31 are squeezed into and maintained in a tight pressing, highly frictional relationship with the probe casing 15 such that the stop may not be moved, thus providing a positive locking stop which remains immobile while seating the thermometer probe at the desired distance within the steak. The split sleeve 26 may be made of a flexible material such as, for example, a plastic, the primary criteria being that the material has heat resistance and flexibility characteristics. The nut 33 may be made of a more rigid material such as, for example, aluminum.

The indicator head 12 includes a hat-shaped drum 35 having depending side walls or vertical cylindrical surface 36 and a horizontal surface or face 37 with a temperature scale, which is calibrated in degrees, for determining an exact temperature reading, when desired. Spaced from the face 37 of the indicator head 12 is the twin-tipped pointer 19 which is secured at its center 38 to the shaft 18, thereby providing the interconnection between the pointer and the bimetallic temperature sensing coil 17 which causes the pointer to rotate as the coil expands or contracts, due to the changes in temperature at the temperature detector 14. Depending from and secured to each tip 39 of the pointer 19 is a flag 40 which is carried with the pointer as it moves from one position to another on the scale. The flag 40 overlies the depending side walls 36 and should be of a color distinctly contrasting with the color of the side walls such as, for example, a yellow flag and a black drum.

Associated with the hat-shaped drum 35 in a snap-on relationship, as at 41, is a clear, rigid cover or housing 42 which protects the pointer 19 and the flags 40 from inadvertent contact, thereby also protecting the bimetallic temperature measuring coil 17. The clear cover 42 is provided at its open end, along its outer periphery, with a projecting lip or rib 43. An opaque selector cap 44 having a rim 45 and depending side walls 46 is snapped into position over the cover 42 by means of an annular groove 47 in the lower edge of the side walls, the groove receiving the lip 43. The selector cap 44 is thereby rotatably mounted and, thus, may be easily rotated relative to the face 37 on the hat-shaped drum 35. The selector cap side walls 46 are opaque and also of a dark color, hence, it is not possible to see the sides 48 of the hat-shaped drum 35 or the flags 39 except through windows or cutouts 49. As best seen in FIGURE 1, the windows 49 of the dark colored selector cap 44 allow the light colored flags 40, although protected by the clear cover 42, to be observed against the dark colored cylindrical drum sides 48 uncovered by the windows. The selector cap 44 has an arrow or indicia 50 on its rim 45 which is to be brought opposite the desired temperature indication on the face 37 of the drum 35 by rotation of the selector cap.

The rotation of the selector cap 44, of course, shifts the position of the windows 49 with respect to the pointer 19, thereby changing the temperature to which a steak must rise before the pointer flag 40 passes from view out of the window corresponding to the preselected temperature. Thus, the presence or absence of the preselected temperature is visibly indicated at relatively substantial distances.

Operationally, the steak thermometer is preferably used, as is shown in FIGURE 1, with a steak 51 as it is grilled on an outdoor charcoal grill 52. For example, if a two inch steak is being grilled, it will be general practice to set the bottom 23 of the adjustable stop 11 at the one inch mark on the probe 10, as it is desirable to have the temperature detector 14 at the center of the steak 51. As before mentioned, the stop 11 may be made slidable relative to the probe 10 by mating the major axes of the nut 33 and the split sleeve 26. When it is desired to maintain the stop 11 in a positive fixed relationship with the probe 10, the major axis of the split sleeve 26 need merely be mated with the minor axis of the nut 33. Thus, the attributes of ease and rapidity of changes, as well as simplicity of construction, have been provided in the adjustable stop apparatus.

Insertion of the steak thermometer may be accomplished by making a small slice in the steak 51 at the desired point of operation and then inserting the tip 16 into the steak until stopped by the stop 11.

The dark colored selector cap 44 is rotated about the face 37 on the indicator head 12 until an arrow 50 is adjacent the desired or preselected temperature of the center of the steak. The pointer 19, as the temperature in the inner portion of the steak 51 increases, will rotate carrying the light colored flags 40 therewith, the flags being visible through the windows 49. When the preselected temperature, as set by the selector cap 44, is reached, the flags 40 will disappear from view and pass behind the walls 46 of the selector cap, thereby indicating that the steak is done to the desired extent. It is preferred to have a light colored flag disappear against a dark background as this is the easiest for the eye to read.

As previously mentioned, the temperature at the center of a steak corresponds to the degree of cooking. For example, if a rare steak is desired, the steak may be placed in position on the grill with a preselected temperature on the indicator head 12 of approximately 100° F. When the flags 40 begin to pass from view, the steak is turned onto its other side and the selector cap 44 adjusted so that the preselected final temperature is approximately 140° F. Now when the flags 40 again pass from view the steak is cooked and ready to be eaten.

Having described my invention, what I desire to claim and protect by Letters Patent is:

1. In a meat thermometer having a heat responsive probe and an indicating head for indicating when a preselected temperature is attained, the improvement comprising
    a drum having a flat surface and depending side walls,
    a temperature scale on said flat surface,
    a rotatable pointer connected to said probe for rotation in response to temperature change and associated with said scale,
    at least one flag depending from said pointer, and overlying said depending side walls and
    an opaque selector cap rotatably mounted over said drum and having side walls spaced from said drum and overlying said flag, the spacing between said drum and cap being greater than the thickness of said flag to permit said flag to move freely therebetween said selector cap having at least one window in said side walls which permits said flag to be visually observed during a portion of the travel path of said flag, whereby said selector cap may be rotated to a position corresponding to a pre-selected temperature, and said pointer will rotate with respect to said window to indicate the attainment of said temperature by the position of said flag with respect to said window.

2. A meat thermometer indicating head as set forth in claim 1 wherein said pointer has two tips with a flag depending from each, and said selector cap has at least two windows, each of which permits a flag to be visually observed during a portion of the path of travel of said flag.

3. A meat thermometer indicating head as set forth in claim 1 wherein said selector cap is provided with indicia in cooperative relation with said scale whereby a preselected temperature may be chosen by rotating said cap.

4. An adjustable stop, which is movably mounted on a meat thermometer probe having a temperature indicator therein, for selectively determining the depth of penetration of said temperature indicator in a cut of meat comprising
    a sleeve slidably mounted on said probe and being split into a plurality of sections and having a collar joining said sections, the internal diameter of said sleeve being approximately equal to the external diameter of said probe and the external surface of said sleeve being elliptical, and
    a tightening nut having an elliptical internal surface mating with the surface of said sleeve whereby said split sleeve may be tightened against said probe by rotating said nut.

5. An adjustable stop for a meat thermometer probe as set forth in claim 4 including calibration indicia on said probe at known distances from said temperature detector in said probe for assisting in the positioning of said adjustable stop.

6. An adjustable stop for a meat thermometer probe as set forth in claim 4 in which said collar projects outwardly to block axial movement of said nut, said sleeve sections having outwardly projecting lips spaced axially from said collar a distance approximately equal to the thickness of said nut, and said sleeve sections being separated from each other by slots of substantial width whereby said sections may be squeezed radially inwardly to permit said nut to be slipped over said lips and thereafter retained on said sleeve between said collar and lips.

7. A meat thermometer for indicating, as a cut of meat is being cooked, when a pre-selected internal temperature of the meat is attained comprising,
    a heat responsive probe having a closed tip and a shank,
    a bimetallic coil within said tip for detecting the temperature of said tip,
    an insulator bushing separating said tip and said shank,
    a shaft connected at one end to said bimetallic coil,
    adjustable stop means movably mounted on said probe for selectively determining the depths of penetration of said probe into said meat, and
    an indicator head mounted on the end of said probe remote from said tip including
    a drum having a flat surface and depending side walls,
    a temperature scale on said flat surface,
    a rotatable pointer connected to said probe for rotation thereby in response to temperature changes and associated with said scale,
    at least one flag depending from said pointer and overlying said depending side walls, and
    an opaque selector cap rotatably mounted over said drum and having side walls spaced from said drum and overlying said flag, the spacing between said drum and cap being greater than the thickness of said flag to permit said flag to move freely therebetween said selector cap having at least one window in said side walls which permits said flag to be visually observed during a portion of the travel path of said flag, whereby said selector cap may be rotated to a position corresponding to a pre-selected temperature, and said pointer will rotate with respect to said window to indicate the attainment of said temperature by the position of said flag with respect to said window.

References Cited

UNITED STATES PATENTS

| | | | |
|---|---|---|---|
| 1,723,390 | 8/1929 | Tingley | 33—172 X |
| 1,897,814 | 2/1933 | Nodine | 73—363.9 |
| 2,597,939 | 5/1952 | Lamb | 116—129 |
| 2,817,968 | 12/1957 | Schmitz | 73—363.9 |
| 2,898,845 | 8/1959 | Dight | 73—352 |

FOREIGN PATENTS

| | | |
|---|---|---|
| 233,945 | 5/1925 | Great Britain. |
| 510,371 | 10/1930 | Germany. |

LOUIS R. PRINCE, *Primary Examiner.*

N. B. SEIGEL, *Assistant Examiner.*